United States Patent Office 3,433,420
Patented Mar. 18, 1969

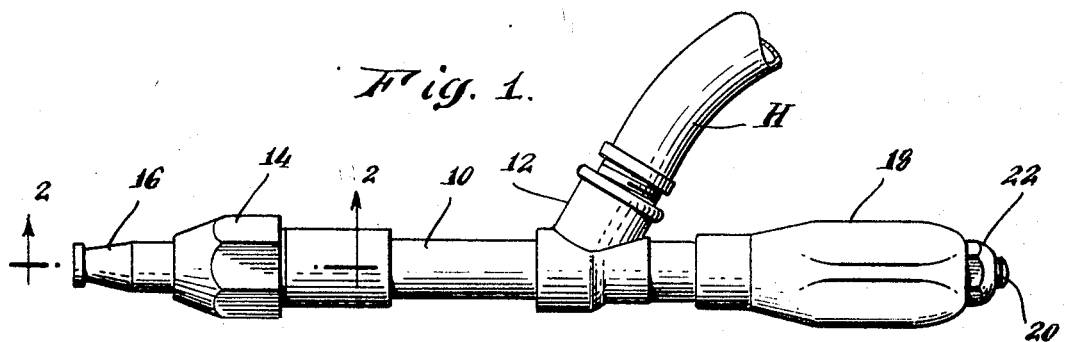
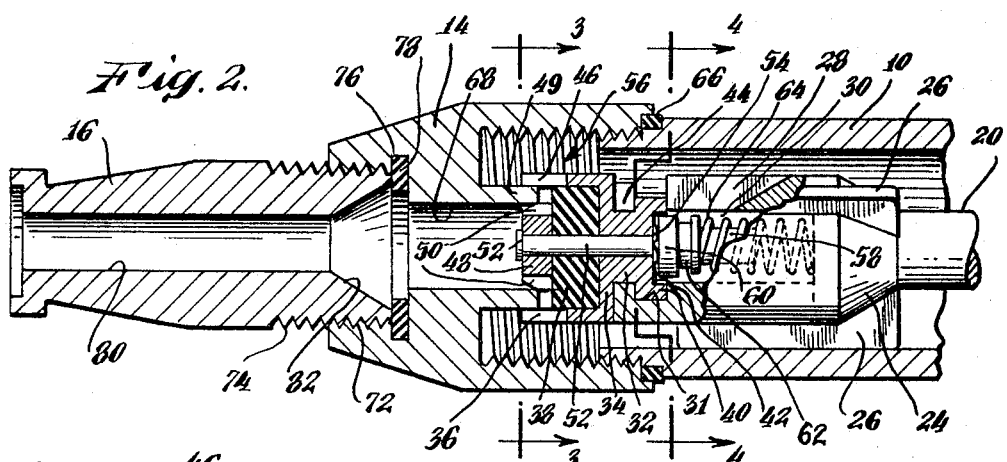
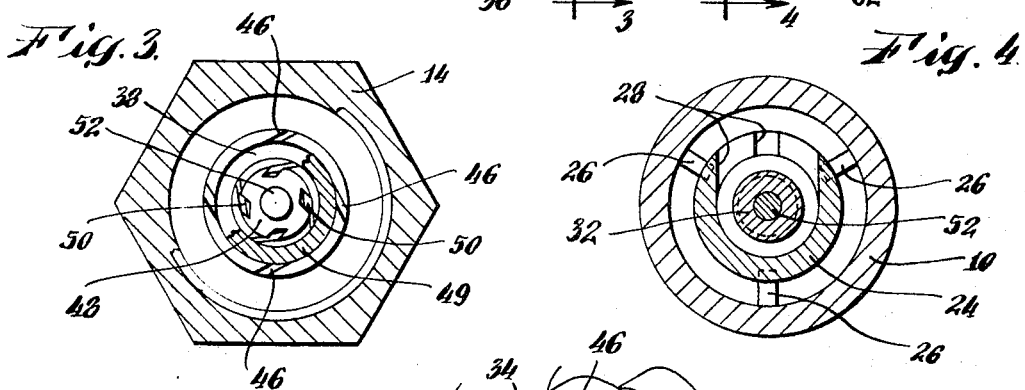
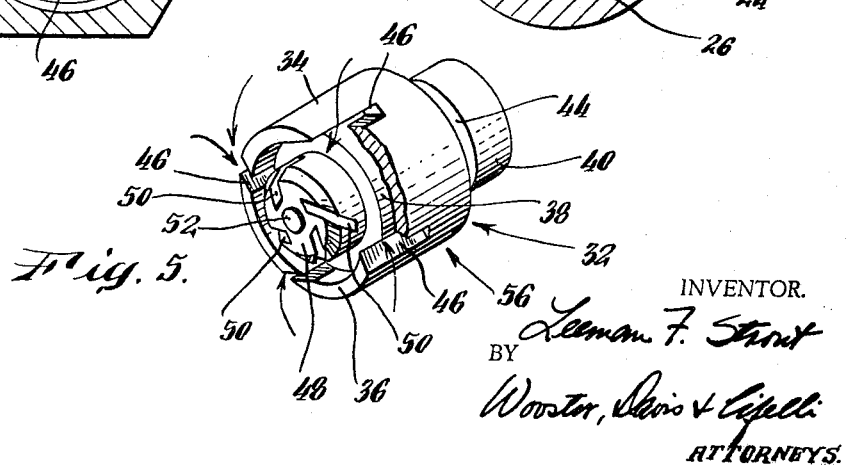

3,433,420
SPRAY NOZZLE AND VALVE
Leeman F. Strout, 93 Rock Ledge Drive, Stamford, Conn. 06902; Ella H. Strout, executrix of said Leeman F. Strout, deceased
Filed Sept. 20, 1966, Ser. No. 580,751
U.S. Cl. 239—476                6 Claims
Int. Cl. B05b 1/32, 1/22

ABSTRACT OF THE DISCLOSURE

The disclosure relates to a spray nozzle and valve for a spray gun, including a stationary valve seat, a reciprocable resilient valve washer secured within a cup-shaped housing with its exposed face positioned behind the lip of the housing. Fluid whirl generating slots are defined in the lip to whirl the fluid over the face of the resilient valve washer as the fluid passes through the open valve. A whirl plate is mounted upon the face of the resilient washer to direct the fluid out of the nozzle in a spiral spray.

---

This invention relates to a nozzle and a valve for a high pressure spray gun and, more particularly, to an improved valve construction which insures a fluid tight cut-off.

In high pressure spray nozzles, of the type used by tree surgeons, wherein the fluid pressure may be as high as eight hundred pounds per square inch, it is extremely difficult to insure an absolutely fluid tight cut-off and a highly responsive spray adjustment. This difficulty arises because of the nature of the valve washer which is needed for such an application. The valve washer must be both sufficiently resilient to allow the valve seat to be engaged tightly therewith and sufficiently hard to resist the embedding of granular particles in its face, which particles may prevent the tight engagement of the valve seat and allow the highly pressurized fluid to "blow" past the valve. Furthermore, in tree spraying applications, chemicals such as D.D.T., are often sprayed which have a deleterious effect on the usual rubber valve washer causing it to swell and to lose its integrity.

The known prior art valve construction comprises an unrestrained rubber washer which is subject to the above described disadvantages. It is therefore apparent that a fluid tight cut-off for a high pressure spray gun requires a highly efficient valve construction.

Accordingly it is a primary object of this invention to provide an improved spray gun valve whose washer is recessed in a seat and is therefore constrained against swelling.

It is a further object to provide an improved spray gun valve in which the face of the rubber washer is maintained free of granular particles by the washing action of the liquid to be sprayed, across the face of the washer.

A still further object is to provide improved means for rotatably mounting the valve housing so that only the longitudinal component of advance, of the usual rotating screw type thrust rod, will be imparted to the washer and no shear forces will be transmitted which tend to destroy the washer.

To accomplish these objects in one form an improved spray nozzle is provided which comprises: a substantially tubular body member; a freely rotatable valve housing located within the tubular body member and including a circumferential sleeve; a valve washer seated within the sleeve so that the front face of the washer is positioned rearwardly of the forward portion of the sleeve, the forward portion defining fluid whirling slots therein; a stationary valve seat for coacting with said washer to cut off fluid flow through the tube; a whirl plate mounted upon the face of the washer; and a nozzle secured to the tubular body member. The fluid, as it passes through the tube, is caused to pass through the whirl slots and across the washer face to the whirl plate, thereby cleaning the surface of the washer before passing out of the nozzle.

Other objects and further details of that which I believe to be novel and my invention will be clear from the following description and claims taken with the accompanying drawing wherein:

FIG. 1 is a side elevational view of a spray gun constructed in accordance with the present invention;

FIG. 2 is an enlarged sectional view taken substantially along line 2—2 of FIG. 1 showing the improved valve and fluid whirl generating means;

FIG. 3 is a sectional view taken substantially along line 3—3 of FIG. 2 and showing the face of the washer between the whirl slots and the whirl plate;

FIG. 4 is a sectional view taken substantially along line 4—4 of FIG. 2 showing the positioning of the valve body within the tubular body member; and FIG. 5 is an enlarged perspective view showing the valve body assembly.

With particular reference to the drawing, there is illustrated a substantially tubular body member 10 having an intake portion 12 to which is connected one end of a hose H, the other end being connected to a suitable source of high pressure fluid. At the forward end of the tubular member 10 there is secured a valve seat housing 14 and secured forward thereof is a nozzle 16. At the rearward end of the tubular member 10 is a rotatable control handle 18 which is mounted on and keyed to a thrust rod 20 disposed within the tubular member 10. The control handle is secured to the threaded end of the thrust rod by a suitable locking nut 22 so that when the control handle 18 is rotated relative to the tubular member 10, the thrust rod 20, which is of the rotating screw type, is also rotated and is reciprocated for advancement and retraction. The construction of the control handle 18 and rotating screw type thrust rod 20 is well known in the art and need not be shown or described herein.

Turning now to a consideration of my invention, particularly as shown in FIGS. 2 and 5, the thrust rod 20 includes an enlarged end 24 supported and positioned within the tubular member 10 by three locating fins 26, which allow the fluid to pass between the enlarged end 24 and the interior of the tubular body member 10. At the lead end of the enlarged end 24 there is a slot 28 communicating with a chamber 30 formed within the end 24. The chamber 30 has a circumferential groove 31 defined in its wall for receiving a portion of a valve body 32.

The valve body 32 is formed with a cup-shaped head 34, including a cylindrical sleeve 36 at its forward end, within which is mounted a valve washer 38, made of rubber or a like material, in such a manner that the front face of the washer is positioned rearwardly of the forward portion of the sleeve 36. Formed at the rearward end of the valve body 32 is a smaller head 40 having a shallow bore 42 and separated from the larger head 34 by a necked portion 44. The valve body 32 is further provided with whirl slots 46 cut into the forward portion of the sleeve 36. These slots 46 are non-radial so that the fluid passing through them is caused to spin or whirl about the interior of the cylindrical sleeve 36 and across the face of the valve washer 38.

Mounted upon the front face of the valve washer 38 is a whirl plate 48 which is of generally cylindrical shape and having a frusto-conical lead end. The diameter of the whirl plate 48 is small enough to allow an annular valve seat 49 to be interposed between the whirl plate 48 and the forward portion of the sleeve 36. The frusto-conical lead end of the whirl plate aids in directing the annular valve seat 49 to a position between these elements. The whirl plate 48 further includes a plurality of whirl grooves 50 cut therein at an angle with respect to both the axis and the radii of the whirl plate 48. These grooves 50 generate a longitudinal whirling or spiralling motion of the fluid through the nozzle 16.

The valve body 32, the valve washer 38, and the whirl plate 48 are maintained as a unit by a headed securing pin 52 having a splayed end 54 or other suitable securing means. The unit forms the valve body assembly 56.

The valve body assembly 56 is mounted for rotation within the groove 31 of the enlarged rod end 24 by means of a spring biasing device located within the chamber 30. This device comprises a cylindrical pin 58 including an enlarged head 60 having a circumferential undercut portion 62. In order to mount the valve body assembly 56 upon the enlarged rod end 24, the cylindrical pin 58 is forced into the chamber 30 by inserting a suitable tool through the slot 28 and into the circumferential undercut 62 and exerting a rearward force upon the pin 58 to overcome the force of the coil spring 64. This removes the pin from interference with the smaller head 40 of the valve body 32 so that the head 40 may be inserted through the slot 28 and be seated within the circumferential groove 31. Once the smaller valve body head 40 is in place, the tool releases the head 60 of the spring biasing device, allowing it to enter the shallow bore 42 in response to the biasing coil spring 64 for securing the head 40 against movement out of the slot 28.

The valve seat housing 14 is threadedly engaged with the lead end of the tubular body member 10 and leakage is prevented by the interposed gasket 66. The valve seat housing 14 has a central bore 68 for passage of the fluid from the tubular body member 10 to the nozzle 16. The housing 14 further includes an annular valve seat 49 which is arranged to cut off the flow of fluid when biased against the valve washer 38. The valve seat 49 is of annular configuration so as to fit between the cylindrical sleeve 36 and the whirl plate 48. The lead end of the valve seat housing 14 is internally threaded at 72 to receive the externally threaded portion 74 of the nozzle 16 and is further provided with a gasket seat 76 within which the gasket 78 is seated for preventing leakage of the fluid between these elements. The nozzle 16 is provided with a conical collector 82 which communicates with a spray forming bore 80 through which the fluid passes to the atmosphere.

Having described my invention of an improved spray nozzle and valve, it will be readily appreciated that the improved valve mechanism is designed to protect the valve washer 38 in several ways and in so doing to insure an absolutely fluid tight cut-off when the valve seat 49 is engaged therewith. First, it will be apparent that the valve washer 38 is prevented from expanding and breaking down by reacting with the chemicals in the fluid, since it is enshrouded within the cup-shaped member 34.

Second, the face of the valve washer 38 is washed by the high pressure fluid as it passes through the whirl slots 46 and is caused to course over the face of the washer 38 (as shown by arrows in FIG. 5), thus cleaning the surface of any granular particles. The whirl slots 46 also serve to direct the fluid to the whirl plate 48 for increasing the efficiency of the spray control.

Third, it will be appreciated that the valve washer 38 will not transmit the shear forces arising when the thrust rod 20 is rotated by the screw advances for closing the valve. The valve assembly 56 is mounted so that it will only rotate with the thrust rod 20 until the face of the rubber washer 38 comes into contact with the valve seat 49, at which time the valve body assembly 56 will be nonrotatable relative to the valve seat 49 and will only move longitudinally with the thrust rod 20 into tighter engagement with the valve seat 49, thus insuring a fluid-tight cut-off. These novel features of my device contribute to the relatively long life of the valve washer 38.

It is understood that the present disclosure has been made only by way of example and that numerous changes in details of construction and the combination and arrangement of parts may be resorted to without departing from the true spirit and scope of the invention as hereinafter claimed.

What I claim as new and desire to secure by Letters Patent of the United States is:

1. An improved spray nozzle and valve comprising: a substantially tubular body member for passing a fluid; valve washer mounting means located within said tubular body member comprising a cup-shaped valve housing including a circumferential sleeve-like wall; a valve washer mounted within said housing so that the exposed face of said valve washer is recessed behind the leading edge of said sleeve-like wall; a valve seat located within said tubular body member adjacent said valve washer and arranged to coact with an exposed face thereof for cutting off fluid flow through said tubular body member; means for relatively reciprocating said valve washer with respect to said valve seat; means for generating a whirling motion of the fluid to wash the exposed face of said valve washer as the fluid passes between said valve washer and said valve seat; and a nozzle for receiving the fluid from said whirl generating means and discharging it to the atmosphere.

2. The improved spray nozzle and valve defined in claim 1 wherein said whirl generating means comprises the portion of said sleeve-like wall extending beyond the exposed face of said valve washer and having a plurality of whirl generating slots defined therethrough for causing the fluid to whirl about the exposed face of said valve washer.

3. The improved spray nozzle and valve defined in claim 2 wherein said whirl generating slots are all equiangularly disposed with respect to the radii of said circumferential sleeve-like wall.

4. The improved spray nozzle and valve defined in claim 1 wherein: said whirl generating means comprises the portion of said circumferential sleeve-like wall extending beyond the exposed face of said valve washer and having a plurality of whirl generating slots, angularly disposed to the radii of said sleeve-like wall, defined therethrough for causing the fluid to whirl about the exposed face of said valve washer; and including further in combination, means for directing the fluid to and through said nozzle comprising a whirl plate mounted upon the exposed face of said valve washer and coaxial therewith and having a plurality of fluid directing grooves disposed therein for directing the fluid through said nozzle.

5. The improved spray nozzle and valve defined in claim 4 wherein: said means for reciprocating is connected to said valve washer mounting means for moving said valve washed into and out of engagement with said valve seat; and said valve seat is a stationary annular member secured to said tubular body member for coacting with said valve washer between said circumferential sleeve-like wall and said whirl plate for cutting off fluid flow.

6. An improved spray nozzle and valve comprising: a substantially tubular body member for passing a fluid; valve washer means located within said tubular body member; a valve washer mounted within said mounting means; a valve seat located within said tubular body member adjacent said valve washer and arranged to coact with an exposed face thereof for cutting off fluid flow through said tubular body member; means for relatively reciprocating said valve washer with respect to said valve seat; means for generating a whirling motion of the fluid to wash the exposed face of said valve washer as the fluid passes between said valve washer and said valve seat; a nozzle for receiving the fluid from said whirl generating means and discharging it to the atmosphere; and means for directing the fluid to and through said nozzle, comprising a whirl plate mounted upon the exposed face of said valve washer and coaxial therewith and having a plurality of fluid directing grooves disposed therein for directing the fluid through said nozzle.

References Cited

UNITED STATES PATENTS

| 75,670 | 3/1868 | Douglas | 251—77 |
| 958,716 | 5/1910 | Bard | 251—77 |
| 2,762,655 | 9/1956 | Charasse | 239—482 |

FOREIGN PATENTS 343,049  9/1936  Italy.

EVERETT W. KIRBY, *Primary Examiner.*

U.S. Cl. X.R.

239—485, 581; 251—77, 81